3,336,201
DUAL FUEL CYCLE FOR NUCLEAR REACTORS
Richard Hugh Graham, Palo Alto, Calif., and Ray Francis Fortune, Kawartha Heights, Ontario, Canada, assignors to Canadian General Electric Company, Limited, Toronto, Ontario, Canada, a corporation of Canada
No Drawing. Filed Feb. 16, 1965, Ser. No. 433,189
9 Claims. (Cl. 176—30)

This invention relates to a method for extending the burn-up range of nuclear fuel by first utilizing it in one type of reactor and then utilizing it further in another type of reactor.

Nuclear reactors in use at the present time for generating large quantities of heat, e.g., steam for driving turbines, may be divided into two general categories according to the fuel used; one uses an enriched uranium fuel, i.e., a fuel containing a content of fissionable isotopes greater than that occurring in nature, and the other a natural uranium fuel. Examples of reactors utilizing fuel enriched in fissionable isotopes are the light water ($H_2O$) moderated, organic moderated, and some graphite moderated reactors, specifically, the so-called boiling water reactor pressurized water reactor. Examples of reactors utilizing natural or normal uranium are the heavy water ($D_2O$), beryllium, and some kinds of graphite moderated reactors, specifically, NRX, NPD or CANDU. Enriched fuel is produced by raising the reactivity level of natural uranium by special processing. When this fuel has been burned in a reactor such as the light water moderated reactor to the reactivity level considered normal for depleted fuel for that particular reactor, its nuclear reactivity is still near or slightly above the reactivity level for natural uranium. Therefore, instead of reprocessing the depleted enriched fuel, we propose using it as fuel for reactors designed to utilize fuel of the lower reactivity level, in particular, reactors designed to burn natural uranium, thereby extending its useful life to an appreciable extent and realizing very significant fuel economies.

Stated briefly, fuel normally discharged from slightly enriched nuclear reactors has a nuclear reactivity above the equivalent of natural uranium and may be utilized directly in natural uranium reactors without reprocessing or re-enrichment. The fuel can be transferred directly from one reactor to the other, or before use in the second reactor it can be processed in one or more of the following ways:

(1) The jackets containing the fissionable materials can be punctured, the fission product gases vented, and the puncture resealed;

(2) The jackets can be removed, the fissionable material crushed, compacted into new shapes, and the new shapes reclad;

(3) Individual fuel rods or other fuel shapes can be arranged in lattices more suitable for use in natural uranium reactors.

After completing a second cycle in the natural uranium reactor, the depleted fuel is transferred to storage because its reactivity level is now too low for further use in reactors known at the present time. It may be stored pending ultimate disposal, for example, reprocessing the material to extract the remaining uranium and plutonium.

The expressions, enriched reactors and natural uranium reactors, appearing in the preceding paragraphs and to be used in subsequent paragraphs refer respectively to reactors in which the nuclear reactivity is above the level provided by natural uranium, and those in which the nuclear reactivity is at the level provided by natural uranium. The above mentioned light water, organic, and graphite moderated reactors fueled with enriched uranium are "enriched reactors," and the above mentioned $D_2O$, graphite, and beryllium moderated reactors fueled with natural uranium are "natural uranium reactors."

Natural or normal uranium contains 0.7115% U-235, and the enriched uranium referred to above contains 0.7115 to 5% U-235, or the equivalent in one or more of the following: U-233, Pu-239, Pu-241. Depleted fuel discharged from an enriched reactor is at U-235 and plutonium concentrations above the equivalent reactivity value of natural uranium, and it can therefore, provide for the natural uranium reactor reactivity above that available from natural uranium. Plutonium is produced in the fuel during irradiation due to breeding of the fertile isotope U-238. Excess uranium and plutonium concentrations above the 0.7115% U-235 for natural uranium may be accommodated in the operation of the natural uranium reactor by proper adjustment of the reactivity control mechanisms or system.

The irradiated fuel discharged from the enriched reactor may be transferred directly to the natural uranium reactor with only visual inspection of the fuel elements to insure they are in good mechanical condition. Elements found to be defective may be discarded, repaired, or reprocessed. Alternatively, each assembly of fuel elements may be dismantled and the elements arranged geometrically in a new array having nuclear characteristics more suitable for the natural uranium reactor. Enriched uranium fuel may be in a number of suitable media such as oxide, metal, carbide, nitride, etc., and the individual pieces may have shapes such as rods, plates, spheres, etc. A number of these pieces are sealed inside a thin walled container made of zirconium alloy, aluminum, stainless steel, or other metals or alloys having a low neutron capture cross-section, which container full of fuel pieces is usually referred to a a fuel element. The elements in an assembly or bundle are held in a fixed geometrical relation dictated by the nuclear characteristics of the reactor in which the fuel is to be used, with the mechanical structure securing the elements in the assembly designed to resist the forces in the reactor and the handling of the assembly. After discharge from the enriched reactor, the assembly of elements can be disassembled, the individual elements inspected and those found in good condition regrouped in a new array suitable for use in the natural uranium reactor. Defective elements can be repaired or reprocessed to render them suitable for use in the natural uranium reactor. For example, a bundle of thirty-six zircaloy-2 clad uranium oxide elements held on one inch centers can be disassembled, and by the use of new end fittings they can be held on three quarter inch centers for use in the natural uranium reactor.

After discharge of an assembly of elements from an enriched reactor, some of the fission products accumulated during initial use of the fuel can be removed before the fuel is used again in the natural uranium reactor. This can be done by puncturing the fuel container and allowing those fission products present as gases to escape. Venting can take place at atmospheric conditions, be accelerated by means of heat to release gases entrained in the solid fuel medium, or the gases can be more thoroughly exhausted by means of differential pressure, preferably with heat added. After the gases have been released, the puncture in the container can be sealed by welding or some other means. The gaseous fission products may damage some of the thin-walled containers, in which case repairs or reprocessing will be necessary.

If necessary, processing of depleted fuel discharged from an enriched reactor may be carried even further before the fuel is used in a natural uranium reactor. In this case the fuel containers can be slit open, the fuel media shaken out and the gases removed by the means mentioned in the preceding paragraph. The partially decontaminated fuel media can now be reassembled in new containers made of the same or a different material, e.g., stainless steel containers can be replaced with zirconium alloy containers, the former being used frequently in boiling water reactors and the latter in $D_2O$ moderated reactors. In some instances, before applying the new cladding, it may be desirable to crush the fuel pieces and then recompact the crushed material into new pieces of another shape, size, density, etc.

Dejacketing fuel elements may also be done by chemical means. First, the sheath is pierced, and then a chemical is applied to the fuel media to cause swelling thereof to break away the sheath, e.g., $UO_2$ is converted chemically to $U_3O_8$. Fission products can now be partially removed from the $U_3O_8$, and the material converted back into $UO_2$, or into another material such as uranium nitride, carbide, or carbide dispersed in graphite. Finally, the converted material can be formed into high density pieces, the pieces sealed in containers, and the containers assembled in a bundle ready for use in a natural uranium reactor.

The combined use of nuclear fuel first in an enriched reactor and then in a natural uranium reactor offers certain advantages and economies over the separate fueling practices now followed. Some of these advantages are as follows:

(1) The useful life of uranium fuel is extended by burning the fuel twice from an enriched reactivity level to a level equivalent to the depleted level for natural uranium. Fueling of the reactors independently requires two different fuels to begin with, each of which must be handled in its own way when depleted.

(2) The dual fuel cycle offers appreciable savings in fuel costs over that of the individual cycle costs. Both fuels start with the same basic material, but processing this material into enriched fuel follows one course; processing it into natural fuel follows another course. Our dual fuel cycle eliminates the second processing course.

(3) At the present time depleted enriched fuel is usually processed, re-enriched, and burned again, and depleted natural fuel is placed in suitable storage tanks. Our dual fuel cycle eliminates the processing and re-enrichment process; the savings also include some shipping costs because the depleted enriched fuel is now shipped from one reactor installation to another rather than to and from the treatment facility.

(4) Much of the plutonium produced in the enriched reactor can now be used directly in the natural uranium reactor.

(5) A natural uranium reactor charged with fuel containing a higher initial reactivity (uranium plus plutonium minus residual fission products if present) than found in natural uranium will operate longer on a charge, thus reducing operating costs connected with fuel replacement.

(6) The utilization of uranium can be increased by eliminating the losses associated with reprocessing and re-enrichment.

What we claim as new and desire to secure by Letters Patent of the United States is:

1. A dual fuel cycle for two nuclear reactors one of which operates on enriched fuel, the other of which operates on fuel depleted to the reactivity level of fuel discharged from said one reactor, comprising (1) utilizing enriched reactive nuclear fuel in said one reactor until its reactivity decreases to the level normal for depleted fuel discharged from said one reactor; and (2) transferring said depleted fuel from said one to said other reactor without intermediate reprocessing by chemical treatment.

2. A fuel cycle as claimed in claim 1 wherein said one reactor is light water moderated, using enriched uranium fuel, said other reactor being $D_2O$ moderated and capable of operation on natural uranium fuel.

3. A fuel cycle as claimed in claim 1 wherein said one reactor is an organic moderated reactor.

4. A fuel cycle as claimed in claim 1 wherein said other reactor is moderated by a moderator selected from the group comprising graphite, beryllium, and beryllium oxide.

5. A dual fuel cycle for two nuclear reactors, one of which is adapted to be charged with fuel at approximately the depleted reactivity level of the fuel normally discharged from the other comprising (1) utilizing enriched uranium fuel in said other reactor until its reactivity decreases to the level normal for depleted fuel for said other reactor, said enriched fuel being in the form of a large number of fuel assemblies, with each assembly consisting of one or more separate fuel elements of size, shape, density and spacing suitable for the nuclear characteristics of said other reactor; (2) physically modifying the arrangement or containment of the fuel assemblies discharged from said other reactor to suit them better to the nuclear characteristics of said one reactor; and (3) utilizing in said one reactor said physically modified fuel until the reactivity level thereof decreases to the normal depleted level for said one reactor, prior to discharge of the depleted fuel therefrom.

6. The fuel cycle as defined in claim 5 wherein the step of physically modifying the fuel consists in dismantling the fuel assemblies discharged from said other reactor and reassembling the elements in arrays suited to the nuclear characteristics of said one reactor.

7. The fuel cycle defined in claim 6 wherein the containers of fuel elements from dismantled assemblies are removed, and the fuel pieces are degassed and sealed in new containers.

8. The fuel cycle as defined in claim 6 wherein the containers of the fuel elements are removed from elements of said dismantled assemblies, the fuel pieces crushed, degassed and formed into new pieces, and the new pieces sealed in new containers.

9. The fuel cycle defined in claim 5 wherein after discharge from said other reactor but before use in said one reactor the containers for the fuel media are punctured, the fuel media degassed and the punctures sealed.

References Cited

UNITED STATES PATENTS 2,856,337  10/1958  Untermyer _____ 176—30

OTHER REFERENCES

Atomic Energy Commission, paper HW–74549 by General Electric Co., Hanford Atomic Products Operation, Mar. 1, 1963, pp. 3–6.

REUBEN EPSTEIN, *Primary Examiner.*